(12) United States Patent
Chien

(10) Patent No.: US 9,182,111 B2
(45) Date of Patent: *Nov. 10, 2015

(54) DESK TOP ITEM WITH LED MEANS HAS USB-UNITS OR USB-MODULE TO CHARGE OTHER ELECTRIC OR DIGITAL DATA DEVICES

(71) Applicant: Tseng-Lu Chien, Walnut, CA (US)

(72) Inventor: Tseng-Lu Chien, Walnut, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/548,620

(22) Filed: Nov. 20, 2014

(65) Prior Publication Data

US 2015/0070896 A1 Mar. 12, 2015

Related U.S. Application Data

(63) Continuation of application No. 14/105,737, filed on Dec. 13, 2013, now Pat. No. 8,911,137, which is a continuation of application No. 13/161,643, filed on Jun. 16, 2011, now Pat. No. 8,783,936.

(51) Int. Cl.

| | |
|---|---|
| *F21V 23/06* | (2006.01) |
| *F21S 8/00* | (2006.01) |
| *G09F 23/00* | (2006.01) |
| *H01R 13/66* | (2006.01) |
| *H01R 25/00* | (2006.01) |
| *H02G 3/14* | (2006.01) |
| *F21V 23/02* | (2006.01) |
| *F21K 99/00* | (2010.01) |
| *F21V 15/01* | (2006.01) |
| *G04B 19/30* | (2006.01) |

(Continued)

(52) U.S. Cl.
CPC . *F21V 23/06* (2013.01); *F21K 9/30* (2013.01); *F21S 6/003* (2013.01); *F21S 8/035* (2013.01); *F21V 15/01* (2013.01); *F21V 23/02* (2013.01); *F21V 23/023* (2013.01); *F21V 33/00* (2013.01); *F21V 33/0004* (2013.01); *F21V 33/0024* (2013.01); *F21V 33/0048* (2013.01); *F21V 33/0056* (2013.01); *G02B 6/0045* (2013.01); *G04B 19/30* (2013.01); *G06F 1/266* (2013.01); *G09F 23/00* (2013.01); *H01R 13/6691* (2013.01); *H01R 25/006* (2013.01); *H02G 3/14* (2013.01); *H02J 4/00* (2013.01); *H02J 7/007* (2013.01); *H02J 7/0042* (2013.01); *H02J 7/0052* (2013.01); *F21V 23/0442* (2013.01); *F21V 33/006* (2013.01); *F21W 2121/00* (2013.01); *F21Y 2101/02* (2013.01); *G02B 6/0021* (2013.01); *H01H 2009/186* (2013.01); *H01R 13/713* (2013.01); *H01R 24/76* (2013.01); *H01R 2103/00* (2013.01); *Y10T 307/406* (2015.04)

(58) Field of Classification Search
CPC G02B 6/0045; H01R 13/6691; F21V 33/006; H01H 2009/186; F21Y 2101/02; F21S 8/035
USPC .......................... 362/95, 157, 641; 439/490
See application file for complete search history.

(56) References Cited

U.S. PATENT DOCUMENTS 8,783,936 B2 * 7/2014 Chien ........................... 362/641
8,899,797 B2 12/2014 Schaak (Continued)

*Primary Examiner* — Anabel Ton
(74) *Attorney, Agent, or Firm* — Bacon & Thomas, PLLC

(57) ABSTRACT

Desk top items with LEDs also include USB-unit(s) or USB-module(s) and, optionally, additional outlet-units, to supply charging power to other electric or digital devices such as a smart phone or digital data device. The USB-unit(s) or USB-module(s) are arranged to supply power only, and do not have an additional USB data transfer function.

16 Claims, 10 Drawing Sheets

(51) Int. Cl.
    *H02J 4/00* (2006.01)
    *H02J 7/00* (2006.01)
    *G06F 1/26* (2006.01)
    *F21S 6/00* (2006.01)
    *F21V 23/04* (2006.01)
    *F21V 33/00* (2006.01)
    *F21W 121/00* (2006.01)
    *F21Y 101/02* (2006.01)
    *F21V 8/00* (2006.01)
    *H01H 9/18* (2006.01)
    *H01R 13/713* (2006.01)
    *H01R 24/76* (2011.01)
    *H01R 103/00* (2006.01)

(56) References Cited

U.S. PATENT DOCUMENTS

| | | | |
|---|---|---|---|
| 8,911,137 B2 * | 12/2014 | Chien | 362/641 |
| 2006/0209530 A1 | 9/2006 | Schaak | |
| 2015/0070896 A1 * | 3/2015 | Chien | 362/253 |

* cited by examiner

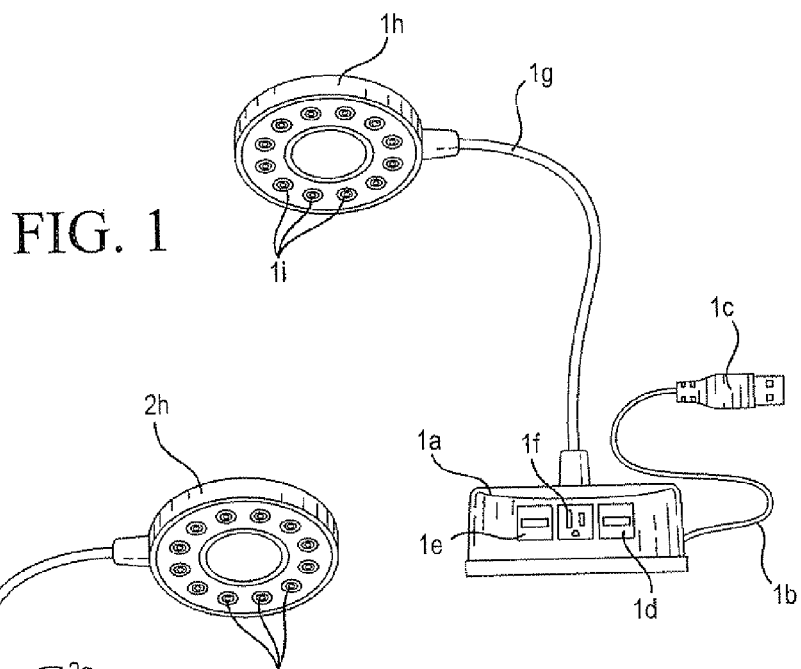
FIG. 1
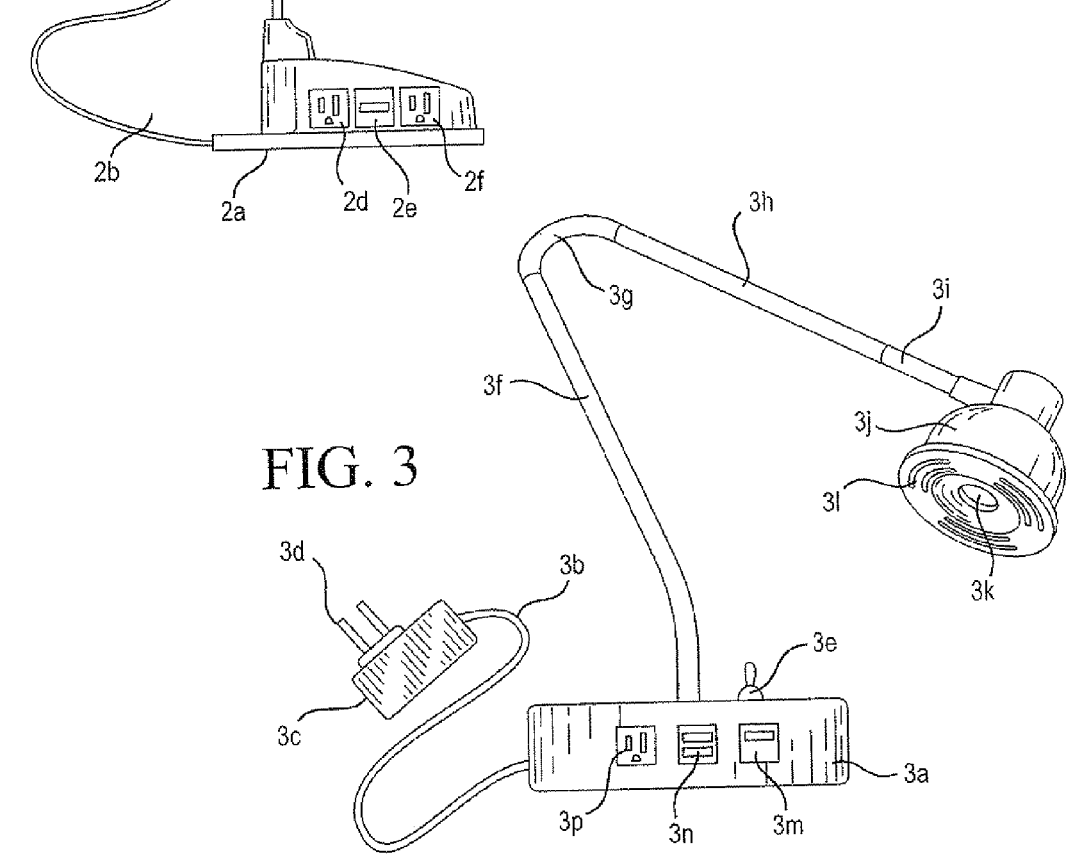
FIG. 2
FIG. 3

DESK TOP ITEM WITH LED MEANS HAS USB-UNITS OR USB-MODULE TO CHARGE OTHER ELECTRIC OR DIGITAL DATA DEVICES

This application is a continuation of U.S. patent application Ser. No. 14/105,737, filed Dec. 13, 2014, which is a continuation of U.S. patent application Ser. No. 13/161,643, filed Jun. 16, 2011, and now U.S. Pat. No. 8,783,936, each of which is incorporated by reference herein.

BACKGROUND OF THE INVENTION

This application is has subject matter in common with the inventor's U.S. patent application Ser. No. 13/117,227, filed on May 30, 2011, and entitled "Universal module of USB-unit or Outlet-units for electric or digital data device(s)."

This application also has subject matter in common with the inventor's U.S. patent application Ser. Nos. 12/502,661, 12/292,580, 12/566,322, 11/498,874, 11/527,629, 12/622,000, 12/624,621, which disclose a sealed-unit with uniform dimensions and shape to fit into the same uniformly dimensioned compartment so that the universal sealed-unit can fit into a variety of LED light devices. The sealed unit(s) disclosed in these applications share the following features:

a. The sealed-unit(s) has uniform dimensions to fit into the uniform compartment of any kind of LED light device.
b. The sealed-unit(s) has passed all related safety standards and received a laboratory's safety certification so that it can be used with other LED light device's parts and accessories which may or may not meet the safety standard passed by the said sealed-unit(s).
c. The sealed-unit(s) can be any individually salable unit because it has passed all related safety requirements and standards. The other parts or accessories may or may not be just decorative or have other functions to make the LED light device more valuable.

The current invention utilizes the sealed-unit concept in the following manner:

(1) The current invention utilizes the concept disclosed in the above-cited applications of providing a sealed-unit that has passed all the relevant safety standards, but applies the concept to other electric device(s) which are not limited to an LED light device. The concept may be applied to an LED light device, power strip device, wall outlet device, surge protection device, wall adaptor device, charging device(s), smart phone related device(s), computer related device(s), and other consumer electric device(s).

(2) The sealed-unit may be in the form of a USB-unit or outlet-unit rather than the previously disclosed LED-unit, battery-pack, or prong-means.

(3) The USB-unit or outlet-unit both may be arranged to supply power from these units to a variety of electric devices to keep the electric device(s) in good power condition for people to use.

(4) The USB-unit or outlet-unit may each include its own related circuit-means, conductive-means, contact-means, receiving-means, output-ends, input-ends, electric parts and accessories to supply electric power from a prong-cable means or USB-cable means to a receiving-means for supplying power to a variety of electric device(s).

(5) The current invention offers a universal design for the USB-unit or outlet-unit with the most compact size to enable each of the USB-unit and outlet-unit or any combination of USB-units and/or outlet-units to form a desired module that fits into all kinds of electric device(s), including an LED light device, wall outlet, wall outlet adaptor, power strips, surge protector, communication device, computer device, consumer electric device, smart phone device, panel computer device, etc.

(6) Once the USB-unit or outlet-unit has passed all related safety standards and has its own issued certification, the finished electric device in which it is used does not need to get an additional safety certification related to USB-units or outlet-units.

(7) The modules of the current invention can utilize any combination of suitable USB-unit or outlet-unit parts, such as a conductive wire, conductive plate, conductive means, contact-means, prong-cable means, USB-cable means, prong-means, resilient conductive means, printed circuit means, flexible circuit means, related electric parts and accessories, fixing means, positioning means, and/or installation means to enable the module, outlet-unit, or USB-unit to pass the safety standard and get the relevant safety certification and be added onto another electric device.

(8) The module of the current invention may have different specifications, such as:
  1 USB-unit with 1 USB-port,
  1 USB-unit with 2 USB-ports+1 outlet-unit,
  1 USB-unit with 2 USB-ports+2 outlet-units,
  1 outlet-unit.
  or
  any combination of USB-units and outlet-units that still permits a standard module to fit into different electric device(s) as needed.

(9) The module can also have the following different specifications:
  2 USB ports having different current outputs including 500 ma, 1 Amp, 1.1 Amp, and/or 2.2 Amps to enable the 2 USB-ports to charge different electric devices such as an iPhone™, which needs to have 1 Amp, and an iPad™, which requires 2.1 Amps. If people want to charge 1 iPhone™+1 iPad™ at the same time, at least 3.1 Amps will be needed, which will be very expensive. If people want to charge the 1 iPhone™ or 1 iPad™ at different times, the standard module can be 1 port 1 Amp+1 port 1.1 Amp=2.1 Amps total, and the cost will be cheaper. If people want to charge only 1 iPhone™, only need 1 USB-unit with 1 port which has only 1 Amp is needed for the most economical product. Hence, the module of the invention should not be limited to only one specification.

(10) Because the standard module, outlet-unit or USB-unit is a sealed-unit that has its own issued safety certification and that can fit into the uniform compartment of any other electric device, there is no need to file, for each different electric devices, a UL, ETL, or CSA safety certification, which saves a lot of time for tooling, development, and safety testing for each different electric device. This will reduce a lot of R&D, development, tooling, safety certification time and fees.

The copending application entitled "Universal module of USB-unit or Outlet-unit for electric or digital data device," U.S. Ser. No. 13/117,227, discloses a simple arrangement for enabling "Desk Top items with LED means having USB-unit(s) or USB-module(s) to charge a variety of electric or digital data device(s)," which does not require a universal module because some of the desk top items with LED means have plenty of room/space to accommodate a larger size of USB-unit(s) or USB-module(s) and reduce the cost for related electric components, parts, or accessories to make the items more cost attractive to the consumer. The USB-unit(s) is an electric charging unit which has a USB-female receiving means to receive a USB-male prong to deliver electric power from the USB-female receiving means to the other device's USB-male prong. The preferred USB-female receiving means gets power from a power source and uses circuit means to convert the electric power to a desired waveform, voltage, and current flow or amperage (A or ma) to enable the USB-male means to supply power to other electric or digital device(s).

The USB-module(s) described in the copending application is an electric charging module which has at least one USB-female receiving means but also has a number of receiving means selected from an outlet-female receiving means, USB-female receiving means, an adaptor's female receiving means, or any conventional female receiving means to form a single body which has more than one USB-female receiving means to offer the same or different electric power though the different female receiving means within the one body. The USB-module connects with a power source and circuit-means to offer a desired waveform, voltage, and current (A or ma) to charge other device(s) when the female receiving means is connected with the male prong means of each style of the connect-means.

To enable people to easily reach, touch, operate, or manage the desk top items, the USB-unit(s) or USB-module(s) are installed on or within the item or a substrate(s). The items may be positioned at a location where people will stay for a period of time, such as a desk, table, bed, chair, land, grass, or wherever else people work, rest, or take a nap. For example, people use a computer, laptop computer, iPhone™, iPad™, or iCloud™ on a substrate(s), location, or place such as a table, desk, bed, laptop stand, laptop supporter, laptop cushion or any similar surface(s) which allows people to work, sleep, or lay down for a period of time while charging other electric or digital data device(s).

In all such places where people will stay for period of time, the nearby desk top items with LED means and built-in USB-units easily offer electric power to all other electric or digital data device(s), so people do not need to bend the body to find a power source under the table, which normally is farther away than the desk top items having LED means. Hence, this arrangement offers good convenience for people while they work, rest, or even take a nap, so that they can easily use the USB-unit(s) or USB-module of the desk top items with LED means to charge their small phone, computer, iPad™, or any other electric or digital data device(s) while they work, rest, sleep or take a nap.

It is desirable for the universal module of the USB-unit(s) or outlet-unit(s) described in the copending application to be made as small as possible so that it can fit into as many applications' limited housing size as possible and therefore really meet the goal of universal applicability. On the other hand, the smallest, slimmest, or most compact size of the USB-unit(s), outlet-unit(s), or USB-module is too expensive. For example, the APPLE™ iPhone™'s or iPad™'s USB-unit, which is very small in size, needs to use a very high cost compact transformer or inverter with super big power output in order to achieve a very short time to fully charge the other electric or digital data device(s). This problem can be resolved if, in order to get the USB-3.0 standard 2.1 amp output from the USB-unit(s), the size of some electric components, parts, or accessories such as transformer or inverter, or other same-function electric parts, or accessories can be increased by placing it in a desk top item with sufficient space, thereby obtaining the same big power output at a substantially lower cost to let the consumer save pocket money. Suitable desk top items to which a universal module, USB-unit, or outlet-unit can be added include a desk lamp, desk top clock, desk top radio, desk top fan, desk top lighting, reading light, wall reading light, head lighting, book light, electric picture display, night light with AC to DC power source or adaptor with prong and wire means, projection light with AC to DC power source or adaptors with prong and wire means, electric candle set with AC to DC power source or adaptors with prong and wire means, or any LED device that can serve as a desk top item as described herein and that can accommodate a USB-unit or USB-ports designed only for charging purposes rather than delivery of digital data. The desk top items can provide function(s), performance, and effects(s) including, by way of example, generation of light beams and projection of images such as time images, as well as serving as a source of illumination, music, power, electric signals, photos, and digital signals for sound, light, music, smell or any conventional market-available devices that people will keep on for a period of time sufficient to also enable charging of other electric or digital data device(s).

BRIEF DESCRIPTION OF THE DRAWINGS

FIG. 1 is a front view of desk top items with LED means having USB-unit(s) to charge other electric or digital data device(s), according to a first preferred embodiment of the invention, which has 2 USB-units and 1 outlet-unit, 12 LEDs, and is powered by a USB plug-wire means.

FIG. 2 is a side view of the desk top items of the first preferred embodiment.

FIG. 3 shows a first design of a second preferred embodiment of the invention having 3 USB-unit(s) with different power output to charge different electric or digital data device(s), for example 500 ma, 1,000 ma, 2,100 ma output to charge different electric or digital data device(s) such as an iPhone™ and iPad™ for different requirements for charging current.

FIG. 14 shows desk top items with LED means having USB-unit(s), USB-module, or outlet-unit(s) to allow people to charge other electric or digital device(s), the items including for example a radio, time piece, weather station display, fruit blender, food machine, liquid machine, LED lighting, light fixture, projector, electric fan, heater or any conventional items with LED means built-in.

DETAILED DESCRIPTION OF THE PREFERRED EMBODIMENTS

Figure 4:
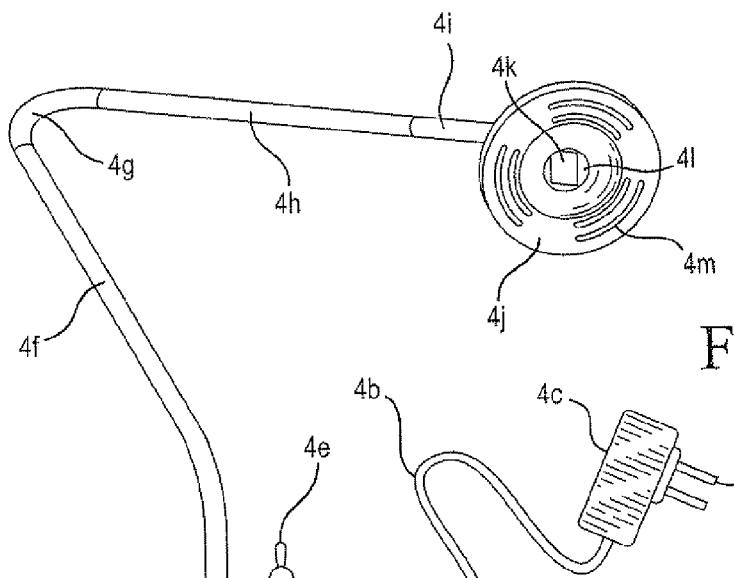
FIG. 4 shows a second design of the second preferred embodiment, which has 2 USB-units and 1 outlet-unit to allow people to charge or supply power to, for example, an iPad™, iPhone™, laptop computer or other device which can get power from the USB-units or outlet-unit.

The present invention provides improvements over the sealed-units disclosed in U.S. patent application Ser. Nos. 12/502,661, 12/292,580, 12/566,322, 11/498,874, 11/527, 629, 12/622,000, and 12/624,621, which have uniform dimensions and shapes to fit into the same uniformly dimensioned compartment and thereby enable the universal sealed-unit to fit into a variety of LED light devices. This invention has more features, functions, and effects to allow people to buy any electric device or digital data device with the additional convenience of including outlet-unit(s) to supply electric power to other device(s), or USB-unit(s) to supply different types of electric power to other device(s). The current invention uses a universal module which can have any combination of the following parts or accessories, including: circuit-means, conductive-means, contact-means, receiving-means, output-ends, input-ends, electric parts and accessories, prong means, rotating means, cable means with a plug, cable means with a USB-plug, printed circuit means, flexible printed circuit means, wires, a cable, a digital data cable, a conductive plate, or any related electric parts or accessories available from the marketplace to get electric power from a prong-cable means, USB-cable means, prong means, or USB means to the outlet-unit's or USB-unit's receiving-means and supply power to a variety of electric devices.

The universal module has a same power-supplying function as the "sealed-unit" for the "LED light devices" described in the inventor's issued U.S. Pat. Nos. 7,726,839, 7,726,841, 7,726,869, 7,618,150, and 7,722,230 and U.S. patent application Ser. Nos. 12/073,889, 12/894,865, 12/003, 809 or the "outlet device" of the inventor's U.S. Pat. No. 7,824,185. Furthermore, the interchangeable "sealed-unit or battery-pack" of the inventor's U.S. patent application Ser. No. 12/622,000 also utilizes concepts shared by the present invention.

FIG. 1 is a front view of a desk top item (1a) with LED means (1h)(1i) and USB-unit(s) (1d)(1e) for charging other electric or digital data device(s) according to a first preferred embodiment of the invention, which has 2 USB-units (1d)(1e) and 1 outlet-unit (1f) at the front of the base. The first preferred embodiment is a 12 LED USB light powered by a USB plug-wire means (1b)(1c) and includes an adjustment arm (1g). FIG. 2 is a side view of the first preferred embodiment of a desk top item (1a) with LED means (2h)(2i) showing 1 USB-unit (2e) and 2 outlet-units (2d)(2f) on the side of the base. The LED means has 12 LEDs (21) in the USB powered light (2h) and is powered from the USB plug-wire mean (2b)(2c)

FIG. 3 a first design of a second preferred embodiment which has 2 USB-unit(s) (3m)(3N) and an outlet-unit (3p) with different power output to charge different electric or digital data device(s). The USB-unit(s) and outlet-unit may be 500 ma, 1,000 ma, and 2,100 ma units to charge different electric or digital data device(s) such as an iPhone™ and iPad™ that have different requirement for charging current.

FIG. 4 shows a second design of the second preferred embodiment which has 2 USB-units and 1 outlet-unit to allow people to charge or supply power to an iPad™, iPhone™, laptop computer, or other device which can get power from the USB-unit(s) or outlet-Unit. The drawing also shows the differences between the first and second preferred embodiments. All such alternative designs, and any improvements or devices with an equivalent function or that are replaceable by the preferred items will still fall within the scope of the current invention, including variations disclosed in the inventor's other patents and patent applications may also fall within the scope of the current invention.

Figure 5:
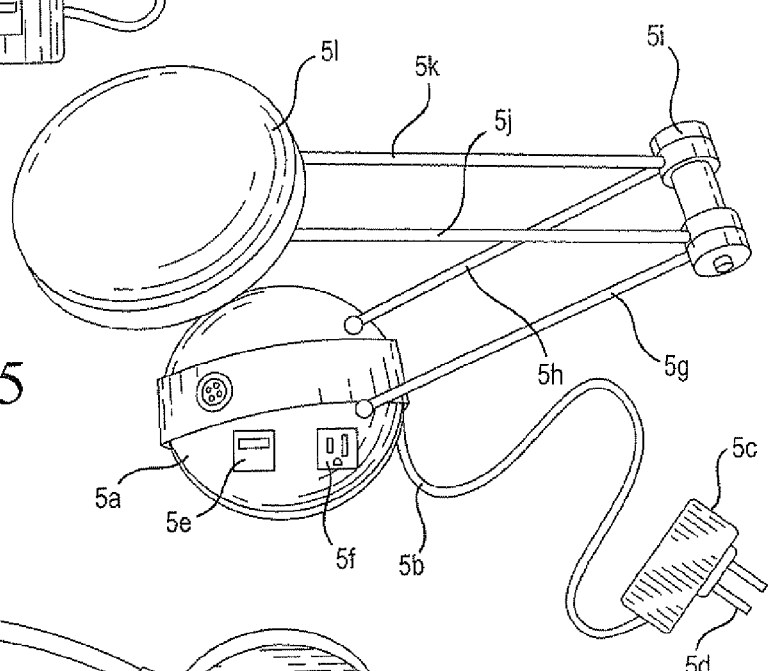
FIG. 5 shows a third preferred embodiment of a desk top item in the form of an LED lighting fixture with adjustable arms to enable adjustment of the height, orientation, direction, and/or angle of the LED lamp to provide the best illumination. The built-in 1 USB-unit and 1 outlet-unit has a lower cost than the above-discussed items with a plurality of USB-units and outlet-units, and is powered by a UL listed adaptor with a transformer plugged into a wall outlet that supplies 120 Volt AC current, rather than by a USB plug and wire.

FIG. 5 shows a third preferred embodiment of a desk top item in the form of an LED lighting fixture (5a) with adjustable arms (5g)-(5j) to enable the LED lamp to be moved to a desired height, orientation, direction, and/or angle to get the best illumination to people. The built-in 1 USB-unit (5e) and 1 outlet-unit (5f) have a lower cost than other above-discussed USB-units and outlet-units because they do not need to be made as compact. The desk top item is powered the transformer of a UL listed adaptor (5c)(5d) that receives power from a wall outlet for 120 Volt AC current rather than the USB plug and wire of the first preferred embodiment.

Figure 6:
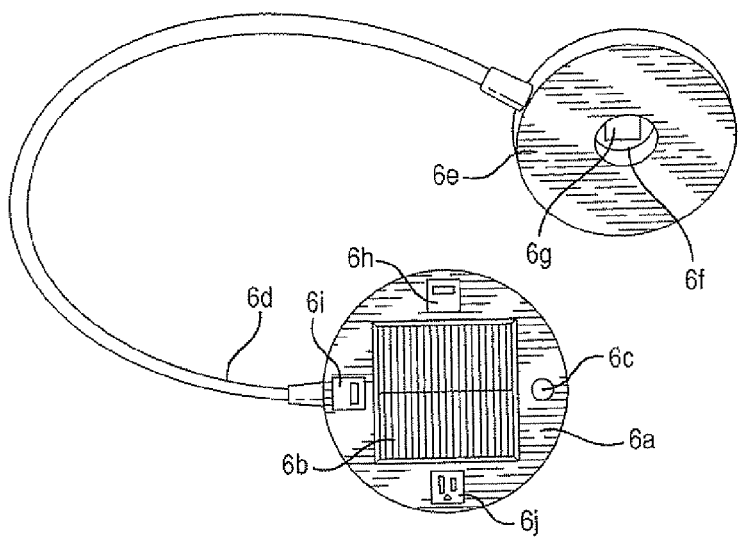
FIG. 6 shows a fourth preferred embodiment which is powered by solar power and stores the solar electricity inside rechargeable batteries to provide enough power to charge other electric or digital data device(s) through built-in USB-unit(s) and outlet-unit(s) incorporated with proper circuit means so as to meet market requirements.

FIG. 6 shows a fourth preferred embodiment which is powered by a solar power array (6b) and which stores the solar electricity inside rechargeable batteries that have enough power to charge other electric or digital data device(s) though the built-in USB-unit(s) (6i)(6h) and outlet-unit (6j) having appropriate circuit means to meet market requirements.

Figure 7:
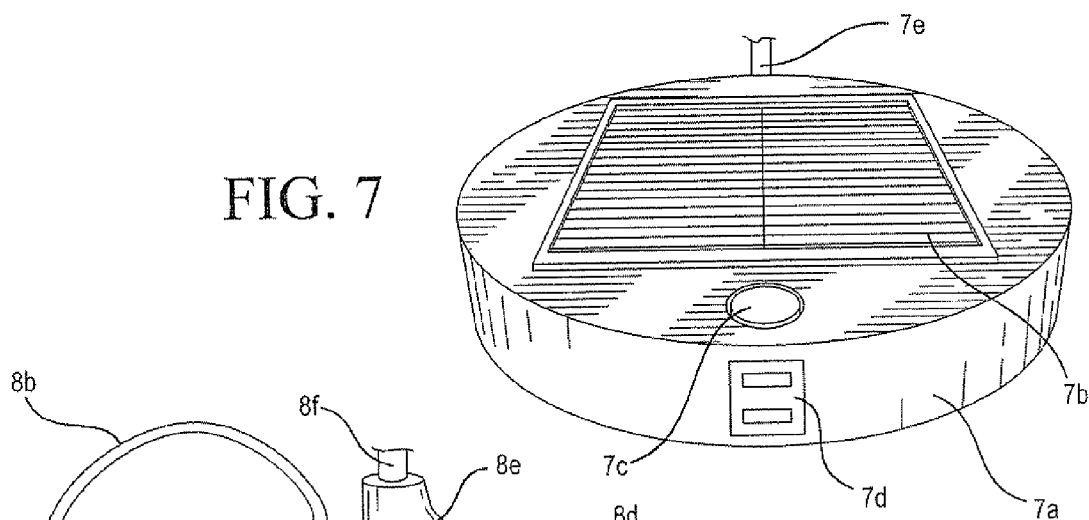
FIG. 7 shows the fourth preferred embodiment, which can also be powered by wind power, chemical power, battery power, a generator, transformer, adaptor, inverter, inductor, etc.

FIG. 7 also shows the fourth preferred embodiment of a desk top item (7a) and USB module (7d), which can be powered by a solar panel (7b) or other available power sources including wind power, chemical power, battery power, a generator, a transformer, adaptors, an inverter, an inductor, etc., and which may further include a switch (7c) and lamp post (7e) corresponding to the one shown in FIG. 6.

Figure 8:
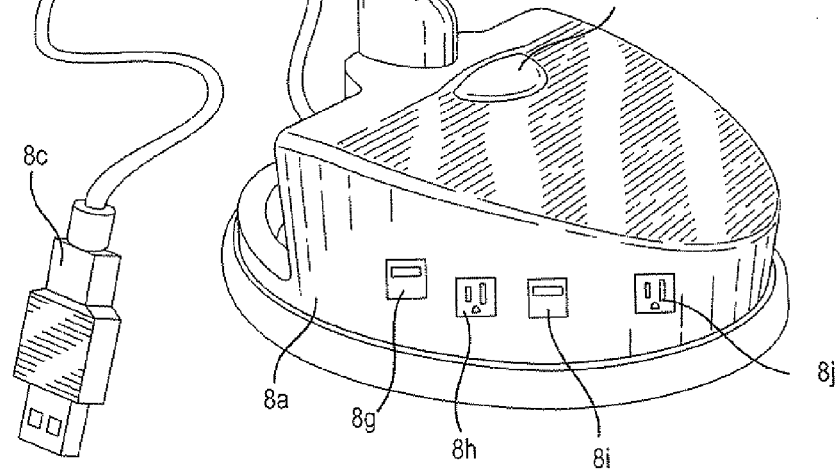
FIG. 8 shows the first preferred embodiment, which has a thicker or higher base to provide a bigger space to arrange bigger size electric parts and accessories to save the cost of super compact, slim, or cute electric parts and accessories, and which also can load a rotating USB-unit(s) or a rotating USB-Module so that a first surface of the USB-module will look nice when the USB-unit(s) or USB-Module is not in use. Details of the rotating USB module are shown in FIGS. 18, 19, 20, 21, and 22
Figure 9:
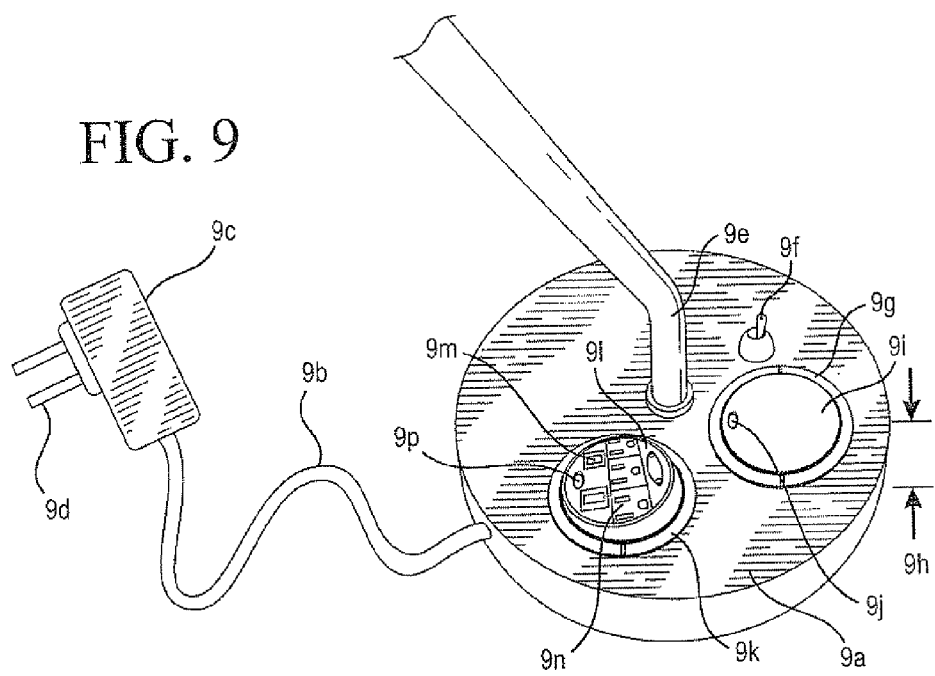
FIGS. 9, 10, 11, and 12 show fifth and sixth preferred embodiments in which desk top items with LED means also have a thicker or higher base, and which can add rotating USB-modules with a plurality of USB-unit(s) and a plurality of other receiving means to increase the number of function(s), feature(s), effect(s), and/or performance(s), the USB-module having more than 1 surface and the capability of changing the surface for different purposes.
Figure 10:
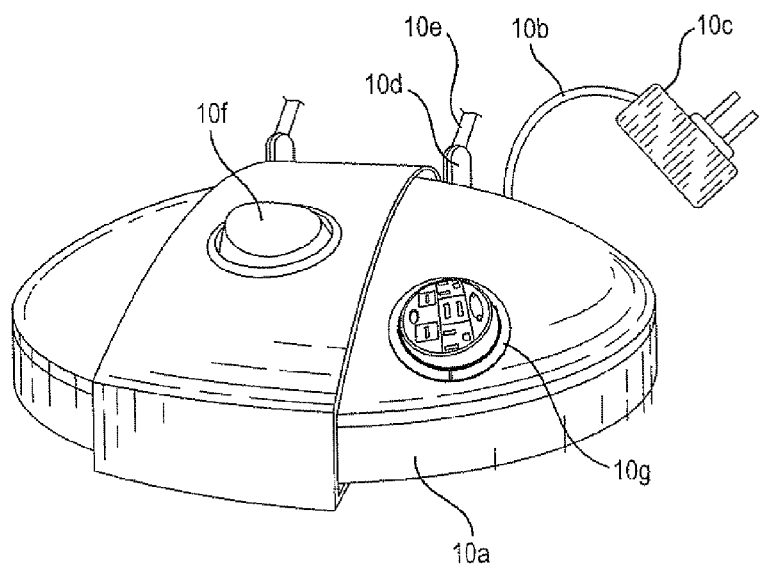
Figure 11:
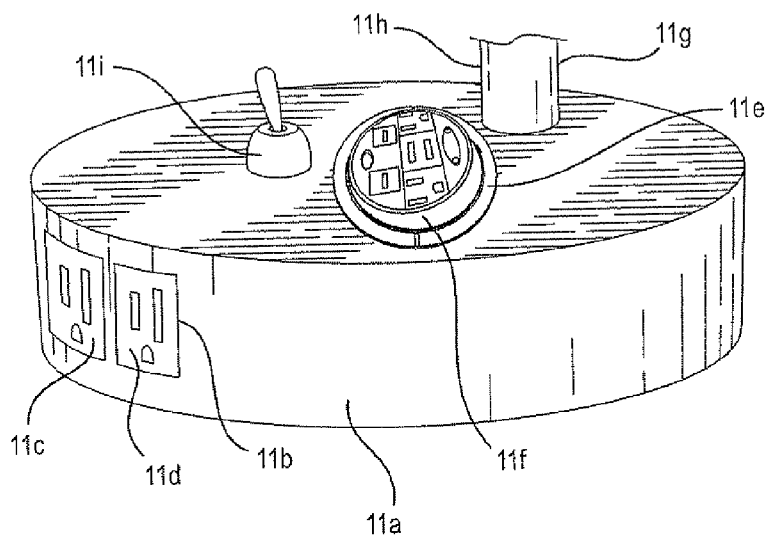
Figure 12:
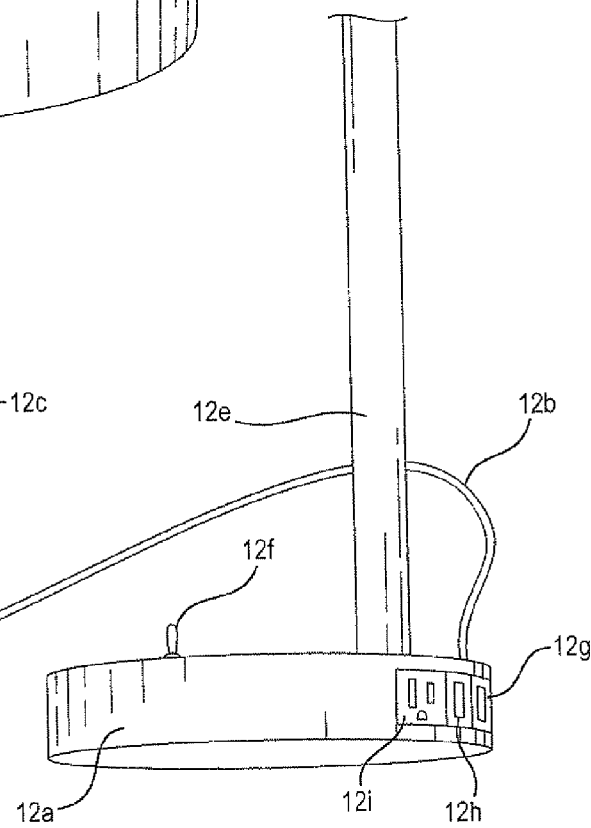

FIG. 8 shows that the base of the desk top item of the first preferred embodiment may be made thicker or higher to accommodate bigger size electric parts and accessories to save a lot of the cost of super compact, slim, or cute size electric parts and accessories. Furthermore, the thicker or higher base can also accommodate a rotating USB-unit(s) or USB-module that can be rotated from a first surface to a second surface so that the first surface of the USB-module will look nice when the USB-unit(s) or module is not in use. Details of the rotating USB module can be understood from FIGS. 18, 19, 20, 21, and 22, the details of which are explained in the inventor's copending U.S. patent application Ser. No. 13/117,227. It will be appreciated that the details disclosed in the copending application may be applied to the present embodiments without departing from the scope of the current invention.

FIGS. 9, 10, 11, and 12 show fifth and sixth preferred embodiments which also have a thicker or higher base for the desk top items with LED means, and to which rotating USB-modules having a plurality of USB-unit(s) and other receiving means can be added to increase the number of function(s), feature(s), effects, and/or performance(s). The USB-modules (9k) to (9m), (10g), and (11e) to (11f) of these embodiments have more than 1 surface to enable different surfaces to be exposed for different purposes. The more than 1 surface of the USB-module can be any number from 2 to N.

Figure 13:
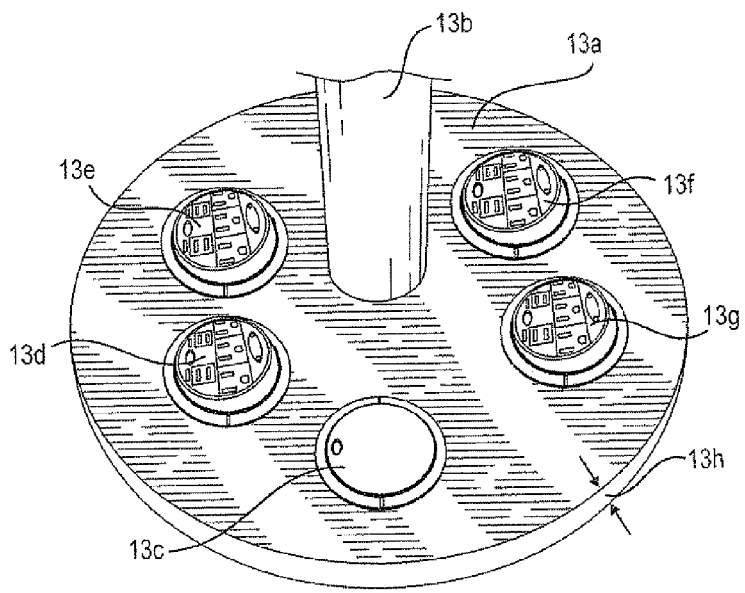
FIG. 13 shows a desk top item which has a super big base size so that a plurality of rotating USB-modules can be installed to enable a group of people to charge their electric or digital device(s) at the same time, such as for use in a train station, bus station, airport, meeting room, hotel lobby . . . etc.

FIG. 13 shows a desk top item (13a) which has a super big base(13h) so that a plurality of rotating USB-Modules (13c) to (13g) can be installed to enable a group of people to charge their electric or digital device(s) at the same time, such as in a train station, bus station, airport, meeting room, hotel lobby . . . etc.

Figure 14:
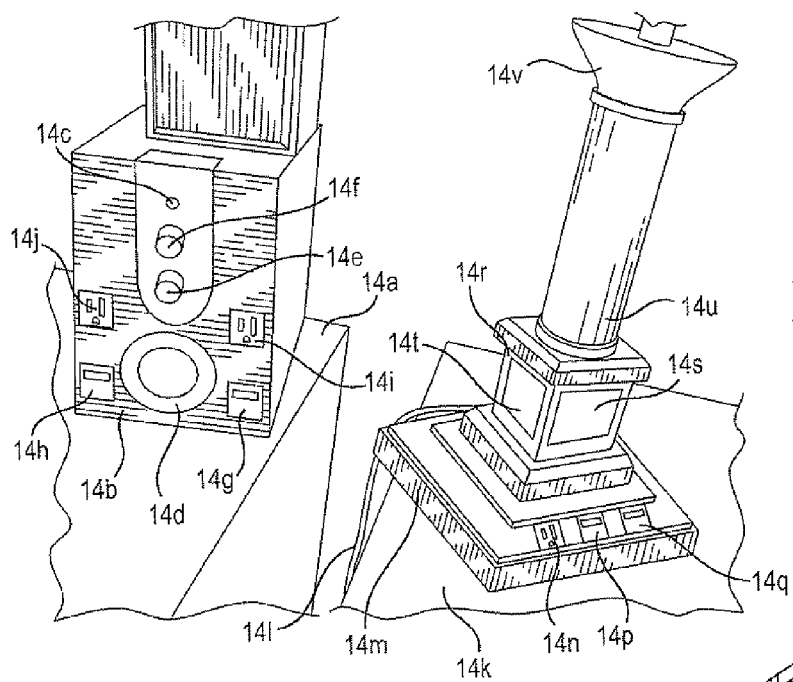

FIG. 14 shows desk top items with LED means and USB-unit(s) (14h)(14g)(14p)(14q), USB-module(s), or outlet-unit(s) (14i)(14j)(14n) to allow people to charge other electric or digital device(s), the items including a radio, timepiece, weather station display, fruit blender, food machine, liquid machine, LED lighting, light fixture, projector means, electric fan, heater or any conventional items with LED means built-in.

Figure 15:
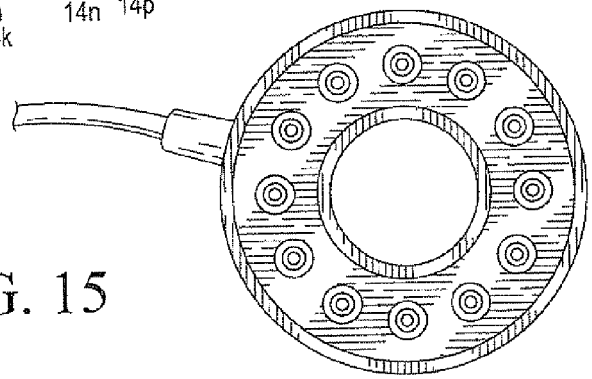
FIGS. 15, 16, and 17 show different LEDs means used for LED lighting in the above-discussed preferred embodiments or other desk top items.
Figure 16:
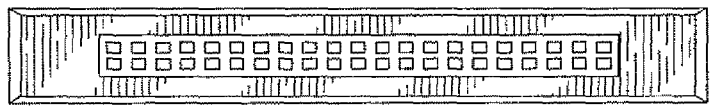
Figure 17:
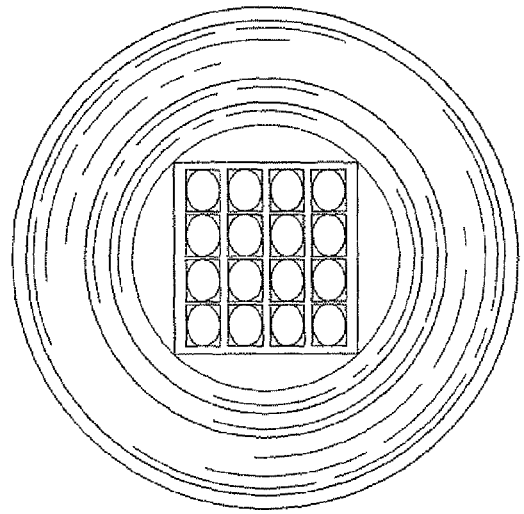
Figure 18:
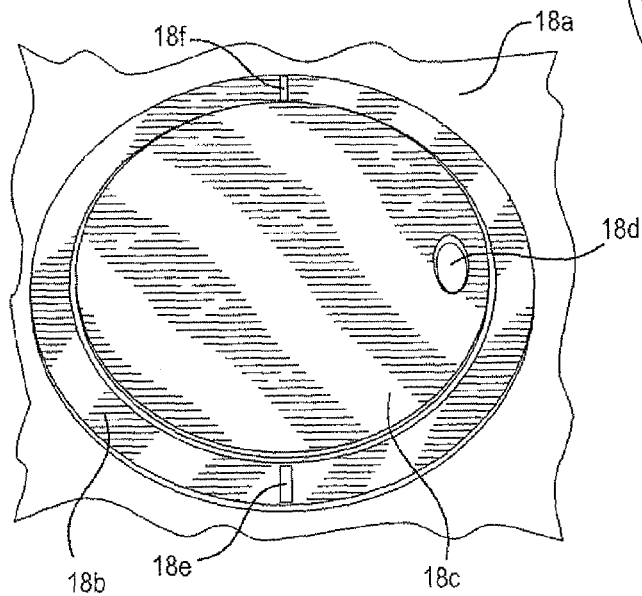
FIGS. 18, 19, 20, 21, and 22 show details of a USB-module with at least one USB-units and a plurality of additional receiving means such as USB-unit(s), outlet-unit(s), Internet-unit(s), adaptor-unit(s), other light means, or other light sources with appropriate parts and accessories.
Figure 19:
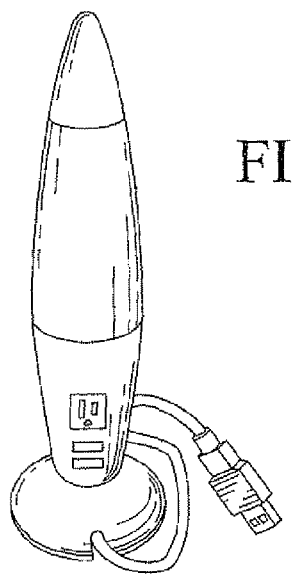
Figure 23:
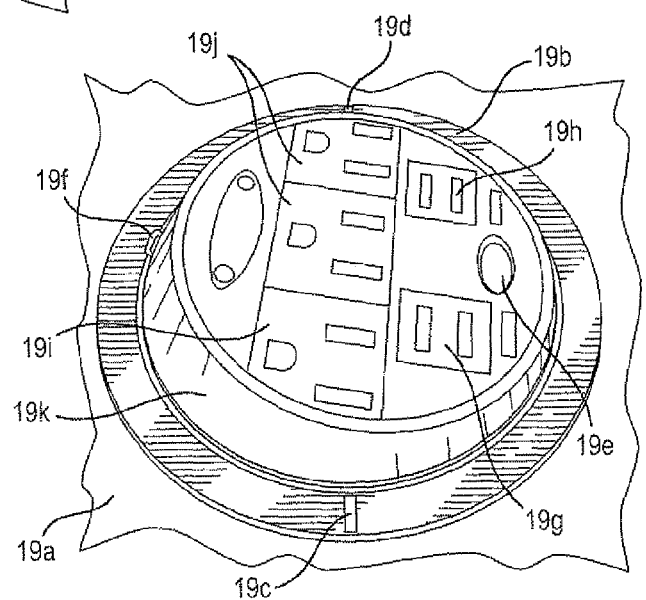
FIGS. 23, 24, 25, 26, 27, 28, and 29 show all kinds of desk top items which offer function(s), effects(s), and/or performance(s) to people's eye, nose, mouth, and/or ears for a period of time while people are working, resting, sleeping, or standing.
Figure 20:
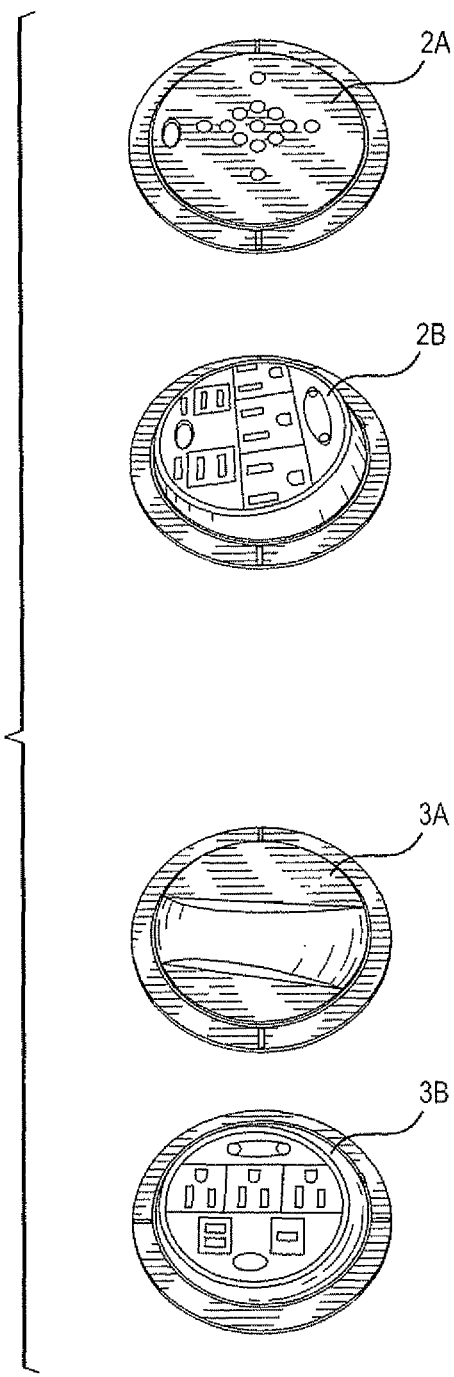
Figure 25:
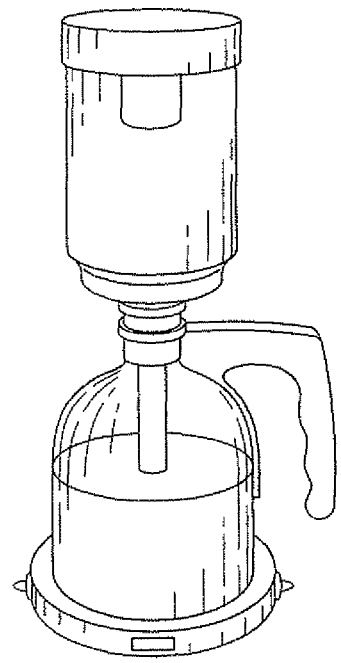
Figure 26:
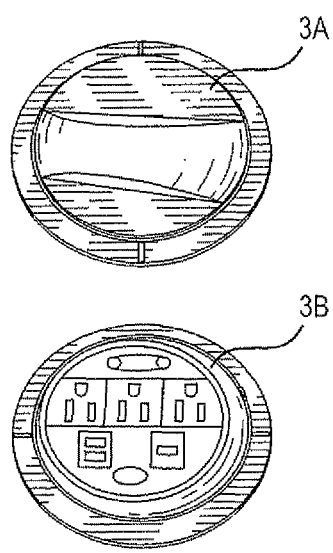
Figure 26:
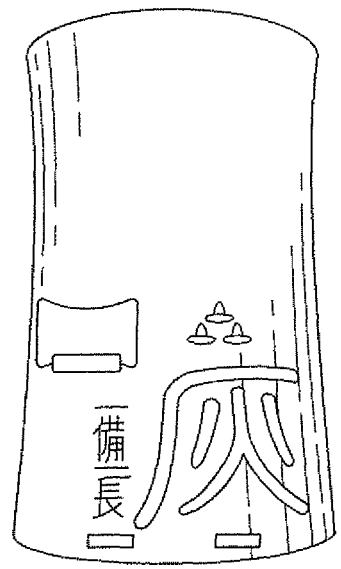
Figure 21:
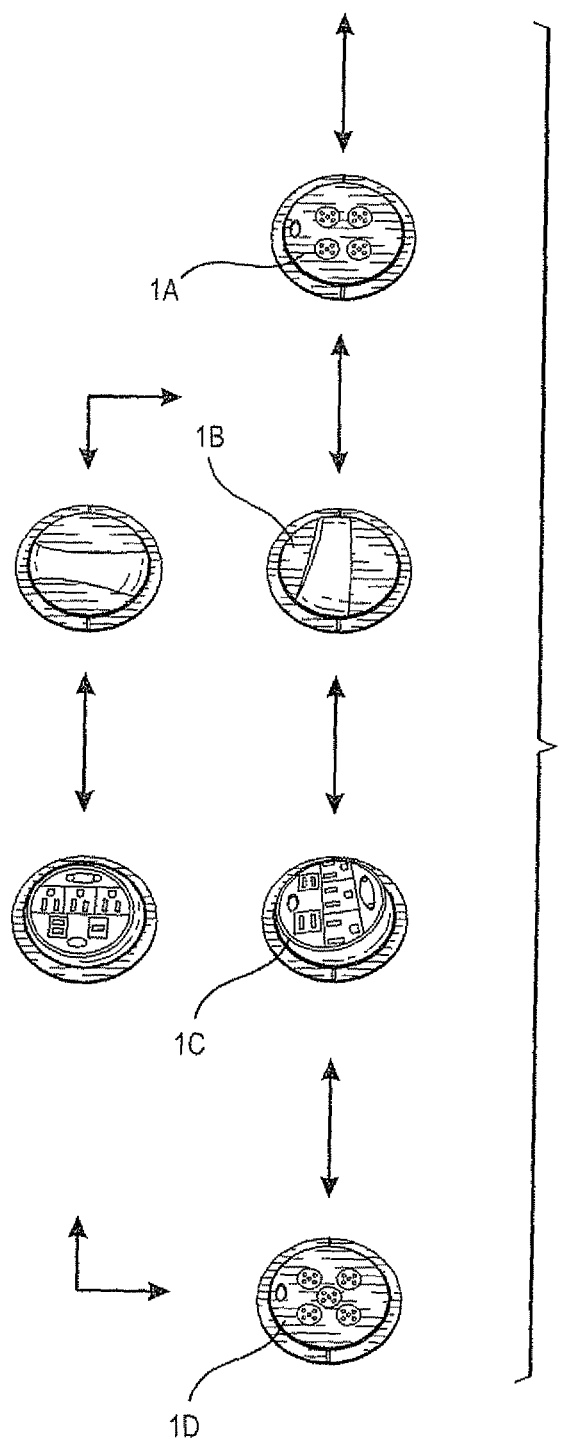
Figure 22:
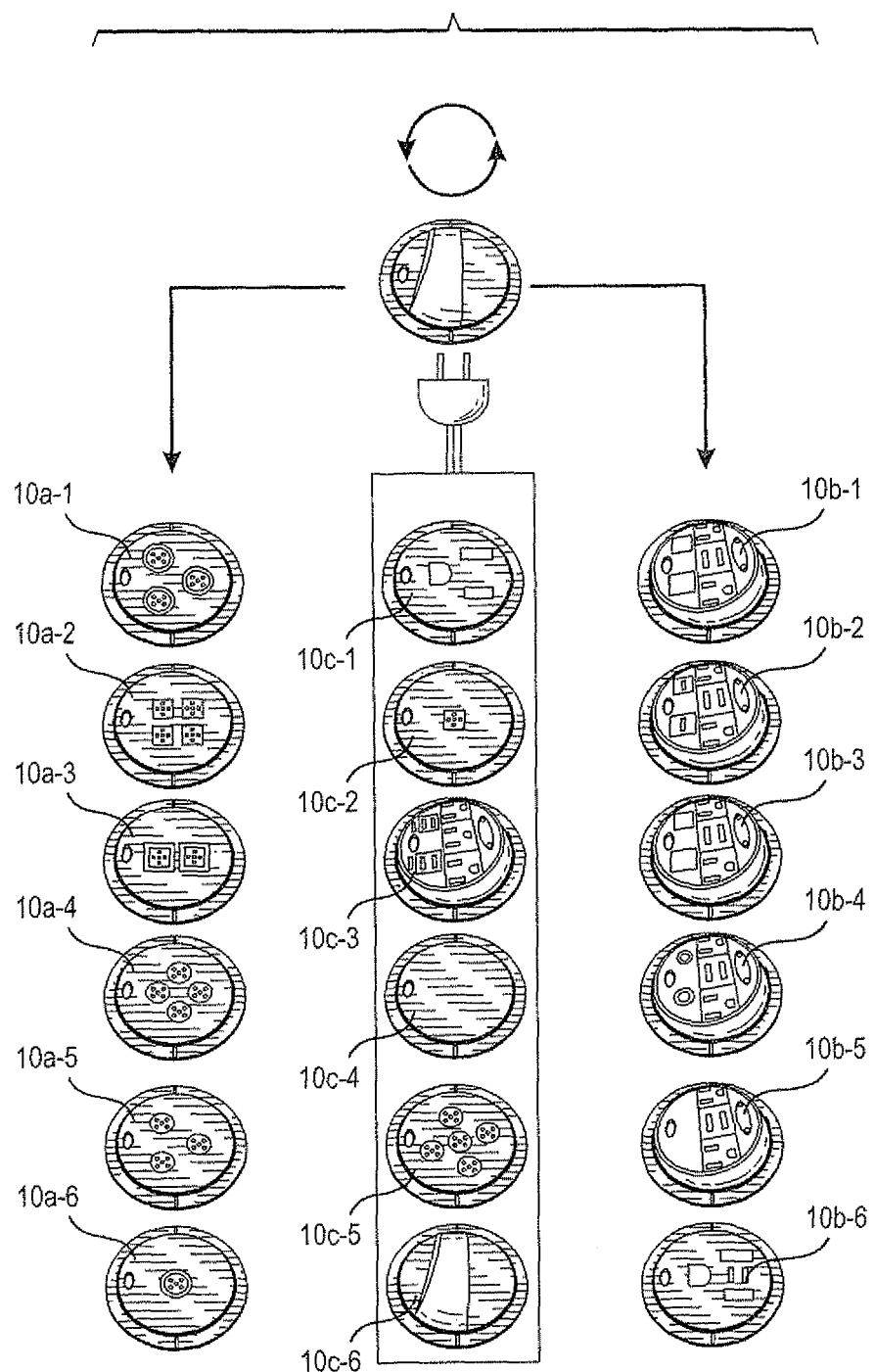
Figure 24:
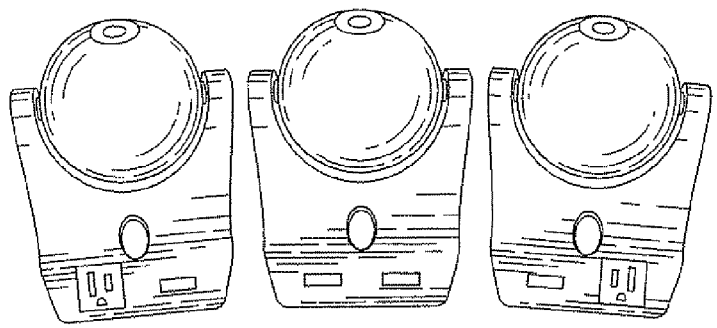
Figure 27:
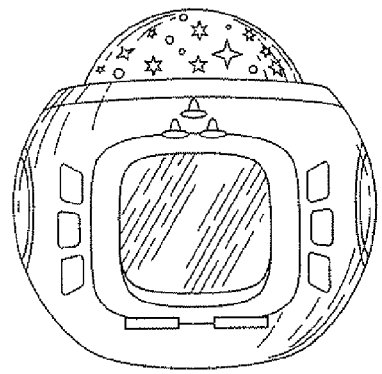
Figure 28:
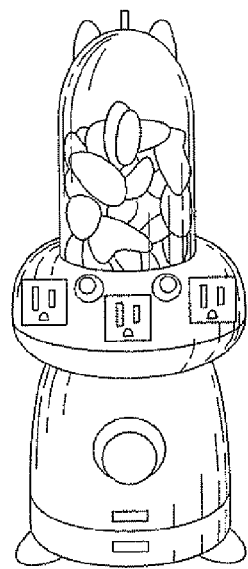
Figure 29:
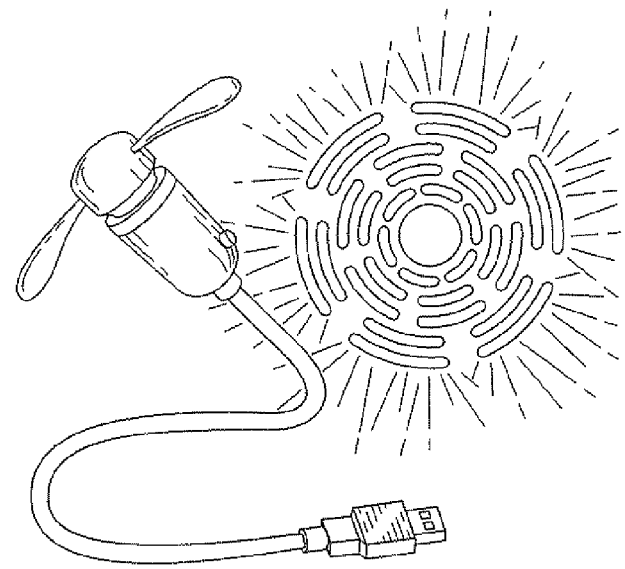

FIGS. 15, 16, and 17 show different LEDs means used for LED lighting in the above-discussed preferred embodiments or other LED desk lamp or LED lamp for a desk top.

FIGS. 18, 19, 20, 21, and 22 show details of a USB-Module (18b)(19b) with at least one USB-unit (19g) and a plurality of additional receiving means, which may include a USB-unit(s) (19h), outlet-unit(s) (19i)(19j), internet-unit(s), adaptor-unit(s), other light means, or another light source with appropriate parts and accessories, or any conventional available receiving means, the USB-module having at least more than 2 surface(s) (e.g., surface (18c) on one side and the USB-unit(s) on the other side), each surface with its own special design.

FIGS. 23, 24, 25, 26, 27, 28, and 29 show all kinds of desk top items which offer function(s), effects(s), performance(s) to people's eyes, nose, mouth, and ears so that people can stay nearby for a period of time as they work, rest, sleep, or stand. The desk top items each have LED means and a USB-unit(s) to charge other electric or digital data device(s) and are arranged to generate, exhibit, or provide light beams, a projected image, a time image, a clock, illumination, music, a power source, electric signals, photos, digital signals, air flow at a desired temperature, moisture, steam, smells, liquid, coffee/tea, and/or food, or to serve as any other conventional device that people will stay around for a period of time while their other devices are charging.

The desk top items, which include LED means or an LED device, are items that are used in locations where they can be easily reached, touched, operated, or managed by people, i.e., in locations or places nearby where people will stay for period of time, such as a desk, table, bed, chair, land, grass, or wherever else people like to work, rest, sit, stand, or a take nap.

As noted above, the desk top items may offer electric signals to carry out functions such as illumination, sound, images, brightness, visual effects, smell, water, liquid, food, wind, moisture, airflow or any conventional functions of electric devices with built-in LED means, such as LED lighting, a clock, projector machine, film, digital photo frame, time display, air freshener, electric perfume freshener, moisturizer, electric fan, electric heater, electric steam spreader, electric cooler, electric air conditioner, or other conventionally available items that can be placed to let people easily reach, touch, operate, or manage the items.

The desk top items may be powered by a direct current (DC) power source or alternating current (AC) power source having appropriate electric parts and accessories or components, such as circuit means, IC means, sensor means, a motion sensor, timer means, time delay means, timer, resilient means, conductive means, transformer means, inverter means, adaptor means, wire means, prong means, UL listed adapter means, PIR means, infrared means, master power control means, and/or AC power outlet-unit(s) to offer electric power at a voltage (Volt) and amperage (Amp or ma) sufficient to achieve a desired charging time. The USB-unit(s) only serve as a power source for charging other electric or digital device(s) and do not have an electric data transfer function. If a plurality of USB-units are provided, the USB-units can be arranged to have different output power to charge different electric or digital data device(s). If additional outlet-units are provided the outlet-units may be AC outlet-unit(s) that serve as an AC power source.

Electric or digital data device(s) that may be charged by the USB-unit(s) include an MP3 or MP4 player, smart phone, computer, iPhone™, iPad™, video game, digital visual equipment, communication equipment, and other consumer electric products.

The USB-unit or USB-module of the preferred desk top items may be turned on or turned off for a predetermined time by switch means, sensor means, timer means, photo sensor means, motion means, time delay means, and/or master control power means.

All electrical connector or plug receiving means in the desk top items, including USB-units or USB modules, may have a removable cover to allow kids or others to safely touch the items and prevent dust, or water from getting into the receiving means.

The USB-unit or USB-module to charge other electric or digital device(s) can be removable from the desk top items and carried with people to use when people leave the desk top items. For this purpose, the USB-unit(s) or USB-module(s) can be disassembled from the desk top items and re-assembled into the said desk top items by means such as a quick connector or adaptor, or assembly or fixing means for assembling or fixing the USB-units or modules to the desk top items, with each of the USB-unit(s) or USB-module(s) having its own safety certification(s) so that the individual USB-unit(s) or USB-module(s) can be tested by safety authorities and sold separately.

The USB-unit(s) includes an electric charging unit which has a USB-female receiving means to receive a USB-male prong to deliver electric power from the USB-female receiving means to the other device's USB-male prong. The preferred USB-female receiving means gets power from a power source and uses its circuit means to convert or transform the electric power to a desired waveform, voltage, and current sufficient to charge other electric or digital device(s) through the USB male means.

The items of these embodiments may be in the form of LED lighting, an LED desk lamp, LED table lighting, LED lava light, LED projection light, LED time piece, LED electric fan, LED air freshener, LED indicator coffee machine, LED indicator sound device, and LED visual device.

I claim:

1. A desk top item with at least one USB-unit or USB-module, comprising:
   a desk top item housing;
   desk top item function means in said desk top item housing for providing one or more of the following functions: a display of light beams from the LED, projection of an image, projection of a time image, clock functions, illumination of an area, playing of music, serving as a source of alternating current (AC) power or electric signals, display of photos, transmission of digital signals, providing air flow at a desired temperature, generating moisture, steam, or smells, dispensing liquid, brewing coffee/tea, preparing food, and displaying charging status; and
   at least one USB-unit or USB-module installed within a space in the desk top item housing and powered by a DC or AC source, said at least one USB-unit or USB-module supplying electric power of a desired voltage and current to charge USB devices having USB connectors plugged into at least one said USB-unit or USB-module, said USB-unit or USB-module including components selected from circuitry, an integrated circuit, motion sensor means, switch means, sensor means, timer means, time delay means, a timer, resilient conductive means, transformer means, inverter means, adapter means, PIR means, infrared means, and master power control means, for converting a voltage and current of said DC or AC source into a USB charging voltage and current and for supplying power to different said USB devices,
   wherein said DC or AC source supplies power to said USB-unit or USB-module and to said LED via circuitry, and
   wherein said USB-unit or USB-module supplies charging power only and has no data transfer function.

2. A desk top item as claimed in claim 1, wherein a number of said at least one USB-unit is at least two, and said USB-units have different output power to charge different electric or digital devices.

3. A desk top item as claimed in claim 1, further comprising at least one additional outlet-unit, including an AC outlet-unit for supplying AC power to said another electric or digital device plugged into said AC outlet-unit.

4. A desk top item as claimed in claim 1, wherein said desk top item housing includes space for a plurality of said USB-units or USB-modules to permit simultaneous charging of multiple said electric or digital devices.

5. A desk top item as claimed in claim 1, further comprising, in addition to said at least one USB-unit or USB-module, additional receiving means for supplying power or signals to electric or digital devices, said additional receiving means including at least one of an outlet-unit, internet adaptor, and AC or DC adaptor.

6. A desk top item as claimed in claim 1, wherein the USB-unit or USB-module is a rotating unit having greater than two surfaces, each surface having different receiving means or features.

7. A desk top item as claimed in claim 1, wherein said desk top item is a light for an LED bulb installation.

8. A desk top item as claimed in claim 1, wherein said USB-unit or USB-module outputs power for another device selected from an MP3 or MP4 player, smart phone, computer, tablet, video game, digital visual equipment, and communication equipment.

9. A desk top item as claimed in claim 1, wherein said USB-unit or USB-module is arranged to be turned on or turned off for a predetermined period by a switch means, sensor means, timer means, photo sensor means, motion sensor means, time delay means, or master control power means.

10. A desk top item as claimed in claim 1, wherein said USB-unit or USB-module has a removable cover.

11. A desk top item as claimed in claim 1, wherein said USB-unit or USB-module is removable.

12. A desk top item as claimed in claim 1, wherein said USB-unit or USB-module is releasably assembled to the desk top item by a quick connector means, adaptor means, assembly means, or fixing means.

13. A desk top item as claimed in claim 1, wherein said USB-unit or USB-module is a separable unit that has its own safety certification.

14. A desk top item as claimed in claim 1, wherein said USB-unit has a USB-female receiving means to receive a USB-male prong to supply power through the USB-male prong to another electric or digital device.

15. A desk top item as claimed in claim 1, wherein said USB-module includes a single body with a plurality of female receiving means for receiving male prong means of different electric or digital devices.

16. A desk top item with an outlet-unit for supplying power to another electrical or digital device, comprising:
   a desk top item housing;
   at least one AC-outlet installed in said desk top item housing for supplying AC power to said another electrical or digital device; and
   at least one USB-unit or USB-module installed within a space in the desk top item housing and powered by a DC or AC source, said at least one USB-unit or USB-module supplying electric power of a desired voltage and current to charge USB devices including at least one of a mobile device, smartphone, game device, consumer electrical device, computing device, and communication device,
   wherein said desk top item is selected from the group consisting of an LED light device, and LED desk lamp, an LED table light, and LED lava light, an LED projection light, and LED timepiece, and LED electric fan, an LED air freshener, a coffee machine with an LED indicator, a sound device with an LED indicator, an LED visual device, or a light device for an LED bulb installation.

* * * * *